P. KROPP.
SEPARATOR.
APPLICATION FILED FEB. 27, 1914.
1,104,051.
Patented July 21, 1914.
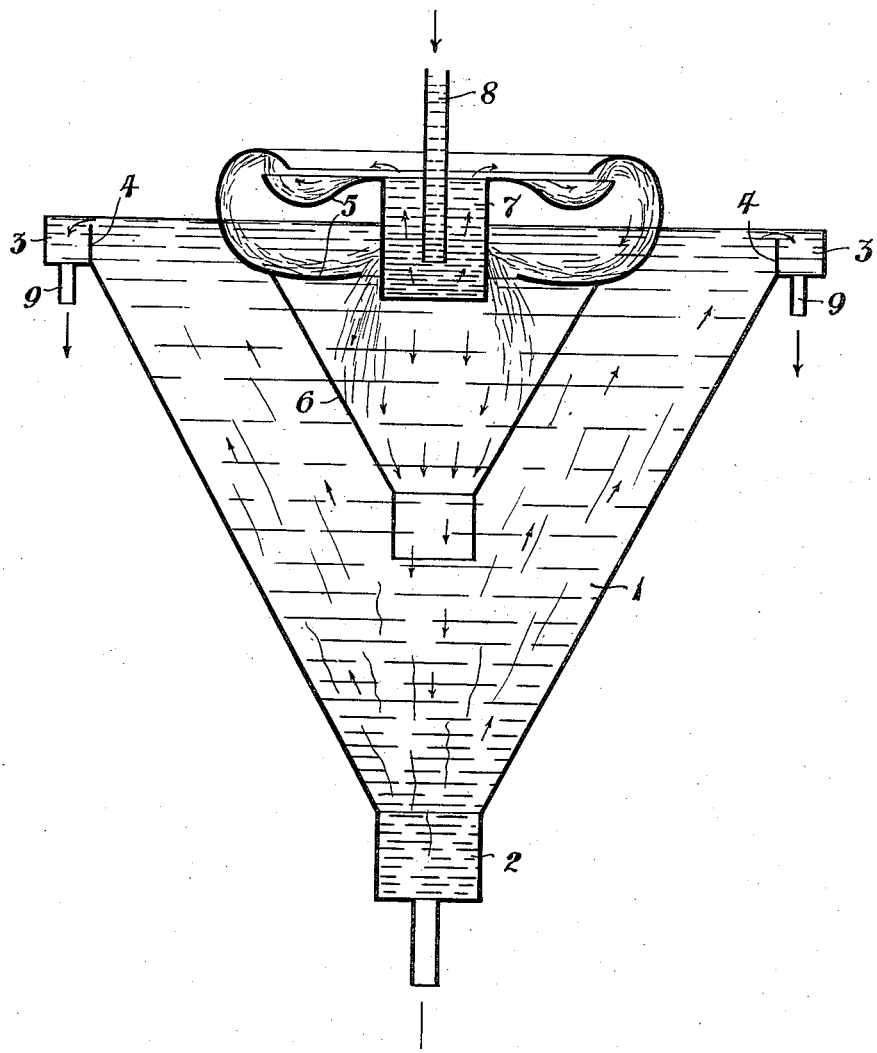

UNITED STATES PATENT OFFICE.

PAUL KROPP, OF DRESDEN, GERMANY.

SEPARATOR.

1,104,051. Specification of Letters Patent. Patented July 21, 1914.

Application filed February 27, 1914. Serial No. 821,606.

*To all whom it may concern:*

Be it known that I, PAUL KROPP, a subject of the King of Saxony, residing at 3 Münchnerstrasse, Dresden, Germany, have invented new and useful Improvements in Separators, of which the following is a specification.

This invention relates to apparatus for purifying water or other liquids by separating therefrom solid impurities contained in suspension in the liquid, and has for its object to provide an improved apparatus of this character which shall be simple and cheap to manufacture and efficient and reliable in operation.

The said invention consists in the construction and combination of parts hereinafter more particularly set forth and claimed, the same constituting a separator of solid substances from liquid, operating by causing the liquid to change its direction of flow suddenly and repeatedly by encountering solid parts of the separator, the suspended solid matter being thereby precipitated in agglomerated masses and the liquid being purified accordingly.

The accompanying drawing represents a vertical central section of a separator embodying my invention.

As shown in said drawing, the separator comprises a conical tank 1 provided at its base with a chamber 2 in which the impurities are collected. The upper and outer edge of the tank 1 is provided with an annular channel 3 communicating above its inner rim 4 with the body of liquid in the tank 1. Centrally located in the upper part of the tank 1 is a separating member comprising a set of deflecting vanes or baffles 5 and a funnel-shaped member 6 open at the bottom and arranged below the baffles 5.

Centrally arranged within the upper portion of the separating member is a receiving chamber 7 into which the inlet pipe 8 of the apparatus projects, the purified liquid being drawn off from the channel 3 by means of outlet pipes 9. Said receiving chamber extends vertically downward below the baffles and is open at the top only. Its side wall constitutes an additional deflecting agent for the liquid. The upper baffle approaches in form an ogee curve and presents upward a shallow broad annular trough or depression consisting of the outer portion of said deflector. The lower deflector is approximately of scroll-form, having its upper edge bent over and down toward the outer portion of this annular depression and its lower edge curved slightly upward toward the wall of said receiving chamber. The liquid passing in all lateral directions out of the top of receiving chamber 7 is directed by the raised outer edge of the upper baffle, which makes the exterior wall of said annular depression, up under the over hanging edge of the lower baffle, then sweeps around the inner face of the lower baffle in a curved downwardly and inwardly directed course and is projected by the raised inner edge thereof obliquely upward and inward against the wall of said receiving chamber necessarily eddying more or less in the space immediately surrounding said receiving chamber and above the lower part of said lower baffle, escaping at last into funnel-form member 6 through the opening between said receiving chamber and said lower edge.

The operation of this form of separator will be evident from an inspection of the drawing, the direction of flow of the liquid being indicated by the arrows. It will be seen that the liquid to be purified first enters the chamber 7 and passes therefrom to the baffles 5. The liquid after leaving the baffles, impinges against the outer surface of the chamber 7, as above stated, and passes downward through the funnel member 6. The passage of the liquid through the baffles and its impact on the outer surface of the chamber 7 causes the suspended particles to become massed together in larger clusters or groups which, owing to their relatively high specific gravity, fall gradually downward into the collecting chamber 2, the liquid, after leaving the funnel member 6, moving in an upward direction and passing, freed from its suspended impurities into the channel 3 from which it is withdrawn and utilized.

I claim—

1. In combination with a collecting chamber for solid matter and a receiving chamber for liquid arranged above the same and open at the top means for directing the overflow liquid of the latter chamber to the former chamber and baffles interposed in its passage, the said liquid receiving chamber being extended downward below the lower baffle and arranged to be struck by the water directed inward thereby so as to change again suddenly the direction of the flow.

2. In combination with a collecting chamber for solid matter and a receiving chamber for liquid arranged above the same means for directing overflow liquid from the latter chamber to the former chamber and baffles interposed in the path of flow of the liquid to change its direction the lower edge of the lower baffle being inclined upward and inward to direct the liquid against said receiving chamber which is extended down far enough to receive such impact.

3. In combination with a collecting chamber for solid matter and a receiving chamber for liquid arranged above the same, means for directing overflow liquid from the latter chamber to the former chamber and a pair of annular baffles arranged around said receiving chamber the inner and upper baffle forming a shallow trough and the outer and lower baffle being of scroll form and presenting its upper edge downward toward said trough, which it overhangs, and its lower edge obliquely upward and inward.

4. In combination with a funnel form part having at its upper end an annular liquid channel and outlet and at its lower end a collecting chamber for solid matter, an inner funnel form part discharging into the one first mentioned, a receiving chamber overflowing into said inner funnel-form part and a pair of annular curved baffles surrounding said receiving chamber, one of said baffles at its upper edge over hanging the other baffle and also presenting its inner and lower edge obliquely upward toward said receiving chamber substantially as set forth.

In testimony whereof I have signed my name to this specification in the presence of two subscribing witnesses.

PAUL KROPP.

Witnesses:
LEO BERGHOLZ,
RICHARD FISCHER.